May 28, 1940. W. C. WHYTE Re. 21,471

COLORING OF BENT WOOD PRODUCTS

Original Filed May 25, 1937

INVENTOR.
WILLIAM C. WHYTE
BY Louis Ellmer
ATTORNEY

Reissued May 28, 1940 Re. 21,471

UNITED STATES PATENT OFFICE 21,471

COLORING OF BENT WOOD PRODUCTS

William C. Whyte, Cortland, N. Y., assignor to Cortland Line Company, Inc., Cortland, N. Y., a corporation of New York Original No. 2,147,587, dated February 14, 1939, Serial No. 144,600, May 25, 1937. Application for reissue March 27, 1940, Serial No. 326,301

9 Claims. (Cl. 273—73)

This invention relates to improved artificially colored articles comprising tenacious, brilliantly dyed hardwoods and more especially as applied to bent tennis racket frames, snow shoes, skis, trout landing net hoops or the like set shapes of arcuate contour. My dyed wood may be penetrated in a uniformly diffused manner to afford a substantially bright appearance throughout the frame body and to impart an attractive, durable and non-streaky surface finish thereto that shall not peel or scruff off.

The harmful effects resulting from the successive hot dyeing, bending and forced drying of such wood products may be minimized by consistently restricting the temperature intensity and by fixing upon the allowable total heat treating time required to complete all operations thereon. The present improvements strive to so control the necessary combined treating steps as to substantially obviate their accumulative detrimental heating effects upon a finished bent wood product, particularly as regards its shock absorbing property against impact loading. In addition, my hot dyeing treatment to some extent improves the properties of a bent laminated racket in that augmented frame rigidity and hardness are imparted thereto over its original plywood stock.

The same dyeing procedure admits of fabricating a hoop shaped frame from a single or different specie of laminated wood in which the respective outer or inner plies prior to gluing, may be dyed in spectral hues in a contrasting or harmonizing color scheme to heighten its decorative appearance as a distinctive marketable commodity over the corresponding use of woods in natural colors. Both the solid and laminated types of artificially colored racket frames are made to preserve adequate tensile strength and other inherent qualities by resorting to a suitable primary grade of wood that will effectively meet over a prolonged period of usage, the arduous requirements of a batlike ball striking implement without latent flaws or superficial discoloration.

The preferred grade of hardwood to be employed in the fabrication of my dyed racket frame or the like, is second growth, commercial white ash, particularly its selected straight-grained or clear sapwood which may be made to preserve its inherent strength when properly heat treated. The grain of all bent plies properly extends in a direction lengthwise of the hoop contour. Said stock also affords the required initial or natural pale base into which to uniformly impregnate any desired bright coloring matter, preferably certain kinds of water soluble, organic dyestuffs of an extremely soluble character, since apparently not all of the so-called anilin or the like synthetic dyes react in the manner herein contemplated. The cited white sapwood of ash ranks relatively high in specific gravity, tensile strength, toughness against impact loading, bends flawlessly in relatively thick plies, and retains its set shape to a marked degree after being bent to form.

The fact that such wood does possess a low volumetric shrinkage from a green state into an oven dried condition, together with its relatively small natural moisture content, assumes significance in restricting the tendency to swell, to straighten out with increased moisture absorption, or otherwise alter the original arcuate shape of a bent frame when subjected in use to an anticipated rather wide degree of change in atmospheric humidity.

A varnished, painted or shallow stained surface finish for a tennis racket frame or the like is susceptible to weather conditions and its inherent color frailty may ultimately lead to an unsightly, worn appearance. Such superficially applied coatings tend to disintegrate with age by cracking or flaking especially as regards the swinging arched head of a tennis racket which is likely to suffer rapid abrasion in active service. By virtue of a uniform dye impregnation, my frame head will not reveal a different underlying color, although subjected to severe knocks or long repeated ground scraping. A shaped up product of this kind may also during its manufacture, be deeply shaved off and sanded without change in color.

Furthermore, tennis racket frames and the handles thereof not only call for ample inherent strength, but should nicely be held to a definite body size to provide for the requisite heft and resulting fine balanced feel that will wholly satisfy professional playing needs.

In order to realize the maximum break down capacity in a bent laminated racket frame, it is expedient to provide for a high degree of longitudinal shear resistance in each component ply thereof. In accordance with conventional decorative practice, a soft wood inlay is commonly inserted between stronger ash plies in their respective natural colors. An interposed lamination of this species possesses a low shear strength and hence is likely to correspondingly weaken a completed laminated frame. Under break down bending tests, many of such conventional inlays have been found to fail from lengthwise grain shear between the glued ply faces thereof. By resort to a dyed wood inlay possessing a markedly higher inherent shear property, it becomes possible by dyeing, to obtain a far wider color selection together with increased strength at a materially lowered fabrication cost, thereby not only more effectively utilizing cheaper grades of American woods such as white ash, but at the same time obviating the cited grain shear frailty on part of a conventional softer inlay.

In addition, my inner and outer frame plies may without harmful results be dyed to a color that sharply contrasts with their inlays. Woods that present a sharply defined natural color, seldom afford a straight grain cleavage and when attempt is made to use such weaker woods as a heavy reenforcing outer ply, they frequently fracture upon being closely bent to the required shape. The instant innovations pertain to the refined fabrication of a high grade racket frame without allowing its decorative pattern to wear off under prolonged usage.

The fabricating of a tennis racket that shall prove acceptable to experienced players by satisfactory performance, is a difficult art. Present day bent wood tennis frames are required to possess in high degree, appropriate qualities that can only be attained by selecting the most suitable wood species. Any substantial deviation from this exacting standard has generally been found unacceptable to the trade, it being emphasized that a proportionate drop of less than one-half of the maximum attainable break down strength of a conventional all-ash racket, is likely to result in its complete commercial rejection.

The instant ball impelling frame is preferably dyed prior to the moist bending thereof into a required hoop or other arcuate shape, whereupon the partially treated article may be subjected to intensified or oven drying to remove surplus moisture at a comparatively rapid rate. Any permanent injury resulting from such forced drying or discoloration into a comparatively dark shade of the frame stock, may be materially mitigated by a careful control of the temperature elevation of the dye bath and drying oven by definitely restricting the total time during which any high temperature is applied, the heat treatment in its entirety being herein deliberately terminated prior to permitting the residual bending strength of the treated wood to become inordinately lowered or allowing a brilliant spectral color to become vitiated.

The primary object of the present invention is to fabricate a neatly trimmed, decorative racket frame or the like bent shape of either solid or plywood that is dye impregnated in one or more artificially colored base woods, the goal being to generally work for the optimum as regards the application of a durable brilliant pattern or other pleasing color scheme to such wooden structure and thereby provide against superficial discoloration under prolonged hard usage and its resulting wear.

Reference is had to the accompanying one sheet of drawings in which:

Figs. 1 and 2 respectively represent a face and an edge view of a tennis racket treated and equipped in accordance with my invention.

Figure 5:
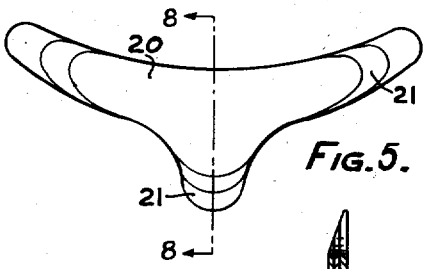
Figure 6:
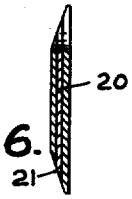

Figs. 5 and 6 detail a modified frame overlay of the laminated type.

Figure 7:
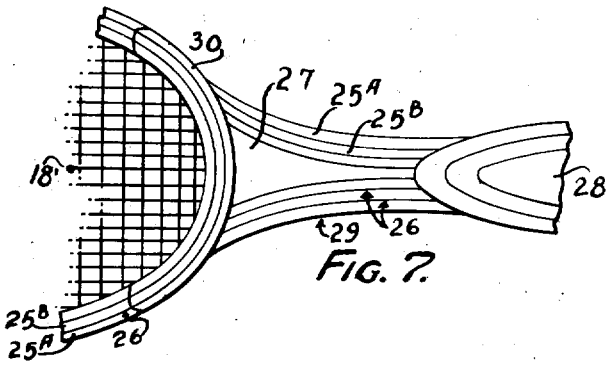

Fig. 7 fragmentally represents a laminated racket frame provided with another style of decorative overlay.

An outstanding requirement in obtaining a so-called brilliant or bright dye shade in distinctive colors, resides in maintaining the natural white or the like pale color of the sapwood (alburnum) portion of ash, or the like hardwood species against scorching without substantial darkening by chemical changes; also in not allowing the treated wood fibers to become embrittled or brash to an extent that will seriously impair the shock resisting qualities and durability thereof under fatigue loading, nor to otherwise substantially affect the wood life for subsequent close bending particularly as applied to racket purposes. Incipient stages of decay induced by excessive temperature, are usually accompanied by a visible discoloration and may cause heat treated wood to undergo pronounced permanent weakening under impact loading. Such impairment is augmented in a proportionate relation to excessive temperature exposure, wood being increasingly injured with a prolonged heat treatment, whether applied during the dyeing or the drying steps. That is to say, the resulting loss in bending strength is accumulative and tends to progressively darken the natural sapwood color by such scorching effects to a point where the dyed colors of a lighter shade may be obliterated by a darkened background and thus materially neutralize or otherwise vitiate certain color effects herein sought.

In order to secure adequate penetration at a rapid productive rate that will produce a uniformly distributed, non-streaky coloring in hard woods, I preferably but not necessarily resort to a hot dye bath held under pressure but limit the exposure thereof to relatively high temperature for a restricted period that will not seriously impair its toughness to shock nor allow its initial pale shade to become darkened sufficiently to overpower the particular anilin dye or some other brilliant coloring agency such as scarlet, canary, Copenhagen blue, emerald green or the like spectral hues, in which it is more particularly intended to dye my bent wood frames.

As as exemplification of a preferred procedure, the following treatment secures the results herein contemplated. Selected white ash sapwood stock may initially be cut into relatively long strips having a cross-sectional thickness of about ⅝″ as suitable for making an unlaminated tennis racket or snow shoe frame of which the grain runs lengthwise without abnormal diagonal slope. A large batch of such strips, stacked in spaced relation may then be set upright on end and immersed in a brilliant dyeing solution held under pressure in a closed jacketed container (preferably porcelain lined and free from the presence of iron or other metallic element likely to affect the dyestuff). The wood should be reasonably dry before immersion since excessive moisture content tends to resist color absorption. Said aqueous bath preferably contains a water soluble anilin dye of the character previously indicated and said wooden strips may under favorable conditions, be initially heated in such solution by steam or other means to about 250° for less than one hour's time, it being evident that the stipulated temperature may be raised or lowered within reasonable limits, depending upon the particular dyestuff employed and the intended dyeing rate.

Thereafter, the steam may be shut off from the digester and air at a pneumatic pressure at about 60 to 70 lbs. gage is maintained on the top of such hot or steaming solution for a subsequent period of some two to three hours to hasten the dyeing process without need of fresh steam, whereupon all the processed wooden strips become impregnated to a substantially uniform shade. My initial steam heating suffices to maintain the dye bath at an elevated temperature with respect to the atmosphere until the color processing is completed. If desired, the usual pre-vacuum process may also be resorted to in facilitating dye impregnation, but this is not essential.

In attempting to color a batch of ash strips in a brilliant spectral hue, the hot dye bath should not be allowed to act for an unduly long period otherwise the bending strength of the dyed wood is likely to suffer material impairment. The treated wood body first becomes superficially penetrated by the dye and finally reaches saturation, whereupon it is preferred to terminate the dyeing operation by removing said strips from the closed container. Should the hot dyeing especially above 212° F., be unduly prolonged, the tendency is first to superficially scorch the wood toward a dull brown shade which with continued excessive processing creeps inwardly and finally becomes diffused over the whole cross-sectional profile of a dye treated wooden strip so as to dominate the desired color shade.

Figure 1:
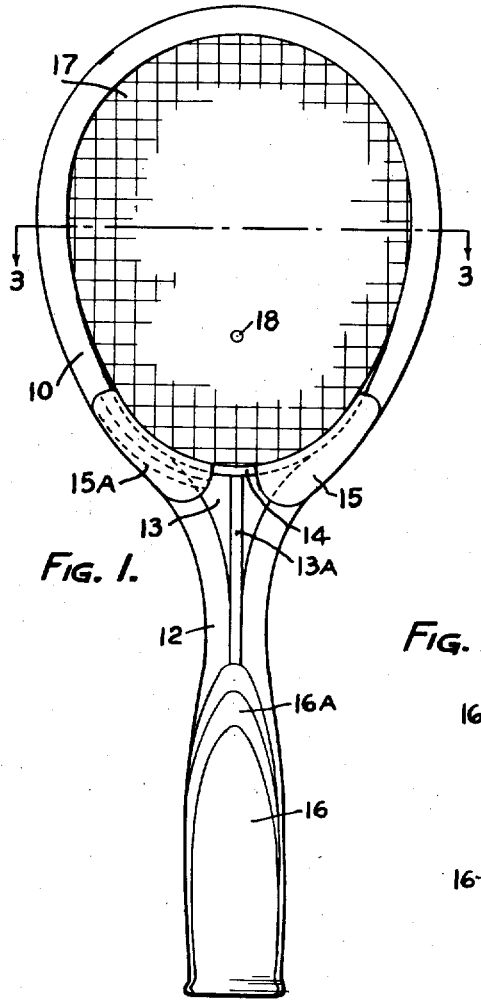
Figure 2:
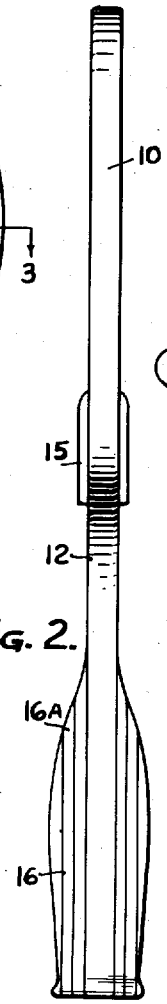
Figure 3:
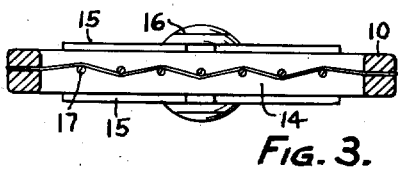
Fig. 3 is a cross-sectional view of a solid racket frame as taken along line 3—3 of Fig. 1.
Figure 4:
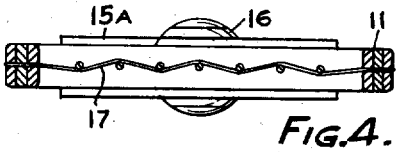
Fig. 4 is similar to Fig. 3 but illustrates a laminated in lieu of a solid racket frame.

While in a water saturated state, such pliant and brightly colored ash strips may individually be sharply bent without substantial fracture and retained about a suitable forming fixture to dry thereon into a looped tennis racket frame represented in Figs. 1 to 3. In this illustrative embodiment, a solid frame member 10 after being dried and set, is given a closed hoop shape having the respective strip end regions extended into substantial parallelism to constitute an integral handle 12. The same style of frame may also be laminated in multiple plies or slats as indicated in Fig. 4.

The crotch portion of such racket hoop may be provided with an inlaid triangular throat piece 13 that is glued or otherwise bonded in place. It is preferred to sectionalize said throat piece into three bonded components including a dividing wooden center spline 13A which latter may be distinctively dyed in a brilliant color shade that contrasts with the adjoining components to constitute a characteristic emblem by which to identify my decorative rackets to the purchasers thereof.

Such frame structure may be further fortified by a glued crescent reenforcement 14 and by separate flat overlays such as 15 or 15A but either type of overlay may be extended into unitary formation as in Fig. 7. Each opposed handle side face or pallette may have one or more reenforcing layers or plural cheeks 16 glued thereon in superimposed relation to enlarge the handle girth and to enhance its decorative display. The closed hoop perimeter may be drilled in multiple to thread the interwoven web strings 17 therethrough.

After the aforesaid dyed frame strips have respectively been bent into hoop shape, they may be transferred into a kiln or the like agency to hasten the drying thereof while still mounted and held around a separate forming fixture, care being taken not to overheat such bent frames so as to avert honeycomb and cell collapse, also to prevent abnormal discoloration of the treated wood or the dye impregnation thereof. Bright anilin dyes when exposed to high temperature for a prolonged period, tend to go over into a darker shade and it is the present aim to obviate such color degeneration by suitably controlling my processing time and temperatures. When too rapidly kiln or oven dried, opposed side faces of the treated frame strips are by abnormal core shrinkage, likely to sink into a cupped formation which may interfere with tight gluing, especially as regards superimposed flat plies or veneer reenforcements.

Said kiln drying or oven baking is preferably carried out by starting at a comparatively low temperature at high humidity and then gradually changing over to a maximum temperature not in excess of 200° F. at a relatively lowered humidity. The accelerated drying process usually requires some 12 to 24 hours after which the set bent frames may be taken out of the kiln at a moisture content somewhat below 6 to 8%. When seasoned to atmospheric condition, the removed frame is made ready to have a throat piece and overlays applied thereto by a suitable adhesive such as animal or casein glue.

In the event flat shoulder overlays or handle layers are provided, they may be dyed and kiln dried in accordance with the same process prescribed for the frame strips after which they may be applied into place. If preferred, a group of my potential frame making strips may initially be dyed and bent up as a whole in boardlike formation, which is subsequently cut into separated racket forming units.

By my refined treatment, undue darkening of the treated wood is not allowed to occur and this in turn, correspondingly prevents serious deterioration of the shock absorbing qualities of a bent racket frame or the like ball impelling implement. When so restricted, the heat treated wood stock is not subjected to sufficient darkening to vitally interfere with the application of brilliant dye of a pale shade. The use of air pressure in following up the initial steaming, tends to preserve the original pale shade of heat treated wood stock. While the use of lower than stipulated temperatures would prolong the process somewhat, the prescribed treatment has been found to afford a commercially useful bent wood frame that retains a high degree of its original strength.

The use of dissimilar species of more costly wood plies possessing contrasting natural colors, is not so well adapted to fulfill exacting frame specifications in so far as their relatively lower intrinsic strength and diverse higher shrinkage properties are not of the same favorable character as those afforded by less costly ash, nor can the same brilliant decorative effects be achieved in natural colored woods.

As a result of extensive comparative tests, I have determined that ash racket frames after being dyed, bent and dried, may be upheld to substantially the same inherent strength possessed by a corresponding undyed ash frame. Plywood when processed in accordance with the herein prescribed dyeing treatment, is further found to enhance both the hardness and rigidity over an undyed frame of equal size. The somewhat greater hardness attained in a laminated frame after dyeing, protects its impregnated pattern against wear and tear, while its augmented rigidity reduces frame warpage when subjected to a high initial stringing tension.

Under favorable circumstances, heart-wood or duramen may be treated by a process similar to that described, but in such event the final color may be expected to become somewhat darker in shade than the natural wood. Heart-wood is inherently difficult to penetrate uniformly but such dye distribution may be facilitated by cutting the wood into relatively thinner slats to more adequately surface the same. Colored slats of this kind may be glue assembled into laminated plywood in the Fig. 4 manner and then bent up into nested hoop shape.

In practice, after having cut ash boards into solid frame strips wholly of either sap-wood or of heart-wood, there remains a certain amount of scrap which may be utilized by further cutting the same into relatively thin slats. Such surplus material may likewise be dye treated in the prescribed manner and worked up into laminated racket frames 11 of which adjacent nested plies may be given harmonizing or contrasting colors. If desired, an inlay of thin basswood, poplar, birch or the like in either their natural state or in an artificially colored condition, may likewise be incorporated and glued between certain of such dyed plies. When different plies of such laminated wood are to be contrastingly dyed, each color requires a separate bath. By virtue of such treatment, the distinct hues of my laminated frame present a sharp demarcation therebetween without need of any interposed inlays.

In a like manner, the throat overlay 15A may be laminated around the curvature axis 18 of the bent frame in the nested fashion indicated in dotted outline in Fig. 1 and worked up into different colors to correspond in matched registry with the plies exposed along one frame side face. In such event, diversely colored segments of my unitary crescent shaped overlay may be bent up from straight stock and otherwise treated in a manner essentially similar to the process hereinbefore prescribed. Inset strips of colored wood, fiber board or the like may be interposed between the overlay plies to heighten the trim thereof.

It will be obvious that a laminated overlay such as 15A may be extended into a bridge piece arranged to span the forked crotch region of the laminated racket frame 11 in the Fig. 7 fashion. In this instance, the plywood frame comprises nested slats 25A, 25B, etc., that may be spaced by thin dyed inlays such as 26. These slats are preferably dye impregnated in distinctive spectral hues constituting a striking decorative frame trim that is primarily centered in its hoop shape and handle neck region 29. The crotch region of such frame may have a throat piece 27 bonded therein. The slat end portions again extend outwardly away from such forked crotched region into an integral handle member 28 of which the interposed neck region is preferably contracted with respect to the girth of the handle grip portion. An ornamental overlay such as 30 may be superimposed to cover a side face portion of the throat piece and to span the respective forked regions of the bent slats 25A, 25B, etc., as shown, said overlay being laminated in upstanding edgewise registry with corresponding underlying slats in matched color scheme to virtually complete a series of endless bands arranged concentrically about the axis 18′ and thereby enhancingly alter the embellishment afforded by the aforesaid color trim.

By these means, it becomes possible to achieve strikingly beautiful decorative effects and overlay modifications thereof as applied to racket purposes not heretofore attainable in natural wood colors. As an illustration, a de luxe laminated frame comprising adjoining ash piles may be dyed in delicate harmonizing light and dark shades of a preferred color such as either blue, green or red, and when such different tones of a single brilliant color are assembled, they provide for an exceptionally attractive racket adornment that will not wear off. Complementary thereto, a series of handle reenforcing cheeks such as 16 may be similarly dyed to impart a contrasting or harmonizing color scheme thereto, the respective overlapping forward cheek edges as at 16A then being preferably stepped and beveled to simulate a quarter sawed effect.

As a further variant, a flat overlay such as 20 may also be applied to the side face of a racket frame. As separately detailed in Figs. 5 and 6, such overlay may be laminated flatwise and have certain plies artificially dyed in different colors that respectively extend throughout the length of such plies, the tips thereof as at 21 again being overlappingly disposed in the manner stipulated for the handle checks 16A.

It will be obvious that my combined wood treatment may also be practiced in a reversed order to accomplish the same result by first bending such stock and then dyeing the same, all required steps including kiln or air drying of the product being completed without allowing the dyed wood to become materially darkened to an extent that will vitiate the sought for matched color shade.

In the case of dyeing heart-wood to a mahogany or the like darker color, the anilin dye bath and length of total heating treatment must still be properly controlled for present purposes in order to counteract superficial discoloration by scorching and not allow the dye bath by leaching to go off color to a different shade while treating such wood. For instance, when dyeing a racket frame to a delicate brown color tone, the steaming temperature should be duly limited as to processing time to insure a predictable color result capable of being consistently and regularly reproduced on a rapid scale to a substantially identical shade, particularly so where the dyeing of such article is to be repeatedly held to a given delicate dark color tone. By deeply impregnating a racket frame as described, its surface color may be permanently maintained without pronounced fading or tendency of being absorbed inwardly into an underlying non-colored core stratum.

The foregoing is descriptive of a commodity that has been entirely satisfactory in practice as applied to the manufacture of attractively colored frames of bent wood, and which specification when read in connection with the accompanying drawing, is believed to make apparent to those skilled in this art, the advantages afforded by my improvements, it being understood that the more novel features thereof are subject to considerable latitude in execution, all without departing from the spirit and scope of my invention as defined in the appended claims.

I claim:

1. A laminated wooden frame assembled to include nested plies of one and the same species of wood that are bent into a common arcuate shape and glued together into a unitary structure of which certain plies are dye impregnated in distinctive artificial colors prior to the gluing thereof and whereby ply rigidity is augmented with respect to the similar property originally possessed by such undyed wood species.

2. A unitary implement of laminated wood comprising nested plies that are similarly bent and glued together into a given arcuate shape, certain of which plies prior to the gluing thereof are respectively impregnated with a water soluble anilin dye throughout their respective body confines in distinctive hues.

3. A unitary impelling implement including a dye impregnated bent frame of wood stock that is given a hoop shape having its respective terminals disposed in substantial parallelism to provide for a handle and which frame by the dyeing thereof is rendered somewhat more rigid than the original wood stock prior to the dyeing thereof, and a web strung to span the hoop shaped portion of said frame.

4. An embellished impelling implement having a frame of laminated wood stock including a pair of plies that are similarly bent and glued together flatwise in nested relation, each such assembled ply prior to the gluing thereof being impregnated with a different soluble synthetic dyestuff to impart distinctive artificial colors throughout the respective plies thereof and which plies by the dyeing thereof are in a comparable dried state augmented in superficial hardness with respect to the same property originally possessed by the wood stock and rendered more resistant to superficial abrasive wear without material injury to the original toughness quality possessed by said stock.

5. An embellished laminated racket frame including a pair of nested wooden slats that are similarly bent and glued flatwise into a hoop shape including a forked crotch region from which the several slat ends extend outwardly into a common handle having an interposed contracted neck region, corresponding exposed edge portions of said pair of slats being respectively dye impregnated in distinctive artificial colors to provide a decorative color trim for said frame, and an ornamental overlay of dyed-wood fixedly superimposed upon the aforesaid corresponding exposed slat edges in the vicinity of said crotch region and which overlay is laminated in matched upstanding edgewise registry along a length portion of such underlying slat edges, said overlay leaving a dye impregnated edge portion of the hoop shape uncovered whereby to enhance the embellishment afforded by said color trim.

6. A unitary implement including a dyed-wood frame member bent into a hoop shape providing for a crotch region, an inlaid throat piece bonded into said crotch region, and a dyed-wood overlay fixedly associated with said throat piece, said overlay being cross-sectionally laminated radially around a curvature axis of the hoop shape and having the laminations thereof directed in substantial parallelism with such axis.

7. A unitary ball impelling frame of laminated wood comprising bent hoop shaped plies glued together in nested relation, certain of which plies prior to the gluing thereof being respectively impregnated with soluble synthetic dyestuff in distinctive artificial coolrs.

8. An embellished hoop shaped frame fabricated from bent wood stock to comprise nested laminations that are glued together, one of such wooden laminations prior to the gluing thereof being impregnated with soluble synthetic dyestuff to produce an artificial color that is distinctive from its natural color.

9. An embellished racket frame or the like hoop shaped structure provided with an integral handle, said frame comprising glued laminations of bent wood that respectively extend lengthwise of the hoop forming frame portion in nested relation to terminate in the handle thereof, at least one such wooden lamination prior to the gluing thereof being impregnated with soluble synthetic dyestuff.

WILLIAM C. WHYTE.